US011087199B2

(12) United States Patent
Min et al.

(10) Patent No.: US 11,087,199 B2
(45) Date of Patent: Aug. 10, 2021

(54) CONTEXT-AWARE ATTENTION-BASED NEURAL NETWORK FOR INTERACTIVE QUESTION ANSWERING

(71) Applicant: NEC Laboratories America, Inc., Princeton, NJ (US)

(72) Inventors: Renqiang Min, Princeton, NJ (US); Asim Kadav, Jersey City, NJ (US); Huayu Li, Charlotte, NC (US)

(73) Assignee: NEC Corporation

( * ) Notice: Subject to any disclaimer, the term of this patent is extended or adjusted under 35 U.S.C. 154(b) by 965 days.

(21) Appl. No.: 15/789,614

(22) Filed: Oct. 20, 2017

(65) Prior Publication Data

US 2018/0121785 A1    May 3, 2018

Related U.S. Application Data

(60) Provisional application No. 62/416,767, filed on Nov. 3, 2016.

(51) Int. Cl.
*G06N 3/04* (2006.01)
*G06N 5/04* (2006.01)
*G06N 3/00* (2006.01)

(52) U.S. Cl.
CPC ........... *G06N 3/006* (2013.01); *G06N 3/0445* (2013.01); *G06N 3/0454* (2013.01); *G06N 3/0481* (2013.01); *G06N 5/04* (2013.01)

(58) Field of Classification Search
CPC .............................. G06N 3/0454; G06N 5/04
See application file for complete search history.

(56) References Cited

U.S. PATENT DOCUMENTS

2016/0350653 A1* 12/2016 Socher ..................... G06N 5/04
2017/0243107 A1* 8/2017 Jolley ...................... G06N 5/02
(Continued)

OTHER PUBLICATIONS

Yang, Zichao, et al. "Hierarchical attention networks for document classification." Proceedings of the 2016 conference of the North American chapter of the association for computational linguistics: human language technologies. 2016. (Year: 2016).*
(Continued)

*Primary Examiner* — Hal Schnee
(74) *Attorney, Agent, or Firm* — Joseph Kolodka

(57) ABSTRACT

A context-aware attention-based neural network is provided for answering an input question given a set of purportedly supporting statements for the input question. The neural network includes a processing element. The processing element is configured to calculate a question representation for the input question, based on word annotations and word-level attentions calculated for the input question. The processing element is further configured to calculate a sentence representation for each of the purportedly supporting statements, based on word annotations and word-level attentions calculated for each of the purportedly supporting statements. The processing element is also configured to calculate a context representation for the set of purportedly supporting statements with respect to the sentence representation for each of the purportedly supporting statements. The processing element is additionally configured to generate an answer to the input question based on the question representation and the context representation.

19 Claims, 6 Drawing Sheets

(56) References Cited

U.S. PATENT DOCUMENTS

2017/0372200 A1* 12/2017 Chen .................... G10L 15/22
2018/0032576 A1*  2/2018 Romero ............ G06F 16/24522
2020/0034722 A1*  1/2020 Oh ....................... G06N 5/041

OTHER PUBLICATIONS

Weston, et al., "Memory Networks", ARXIV, Published as a conference paper at ICLR 2015, Nov. 2015, pp. 1-15.
Sukhbaatar, et al., "End-To-End Memory Networks", ARXIV, Mar. 2015, pp. 1-9.
Kumar, et al., "Ask Me Anything: Dynamic Memory Networks for Natural Language Processing", Proceedings of the 33 rd International Conference on Machine Learning, Feb. 2016. JMLR: W&CP, vol. 48, 10 pages.
Xiong, et al., "Dynamic Memory Networks for Visual and Textual Question Answering", Proceedings of the 33 rd International Conference on Machine Learning, Feb. 2016. JMLR: W&CP, vol. 48, 10 pages.

\* cited by examiner

CONTEXT-AWARE ATTENTION-BASED NEURAL NETWORK FOR INTERACTIVE QUESTION ANSWERING

RELATED APPLICATION INFORMATION

This application claims priority to provisional application Ser. No. 62/416,767 filed on Nov. 3, 2016, incorporated herein by reference.

BACKGROUND

Technical Field

The present invention relates to information processing, and more particularly to a context-aware attention-based neural network for interactive question answering.

Description of the Related Art

With the development of artificial intelligence, question answering (QA) systems have been an important progress to automatically answer questions posted by human beings with a natural language in most online communities. Although a successful question answering system can provide a more natural way of communication such as in areas of customer support, it still nonetheless suffers from many challenges. For example, it is difficult to understand the meaning of a sentence, not to mention reasoning over a story and inferring the answer. Different words may have different meanings in different stories, which increases the difficulty of summarizing each sentence in different paragraphs. As another example, the uncertainty of a question can prevent a machine from correctly comprehending the meaning of the question, which can easily lead to prediction failure.

We provide two examples of question answering problems in TABLE 1, as follows.

TABLE 1

| | |
|---|---|
| The office is north of the kitchen. | The master bedroom is east of the garden. |
| The garden is south of the kitchen. | The guest bedroom is east of the office. |
| Q: What is north of the kitchen? | Q: What is the bedroom east of: |
| A: Office | A: Unknown |

The example on the left is an ideal question answering problem. It can be readily understood what the question is asking and then to locate the relevant sentences to generate the answer. However, it is hard to answer the question of the right example, because there are two types of bedrooms mentioned in the story and we do not know which bedroom the user is asking about. In practice, there are a broad range of similar problems. Therefore, there is a need for an improved approach to question answering.

SUMMARY

According to an aspect of the present invention, a context-aware attention-based neural network is provided for answering an input question given a set of purportedly supporting statements for the input question. The neural network includes a processing element. The processing element is configured to calculate a question representation for the input question, based on word annotations and word-level attentions calculated for the input question. The processing element is further configured to calculate a sentence representation for each of the purportedly supporting statements, based on word annotations and word-level attentions calculated for each of the purportedly supporting statements. The processing element is also configured to calculate a context representation for the set of purportedly supporting statements with respect to the sentence representation for each of the purportedly supporting statements. The processing element is additionally configured to generate an answer to the input question based on the question representation and the context representation.

According to another aspect of the present invention, a computer program product is provided for implementing a context-aware attention-based neural network for answering an input question given a set of purportedly supporting statements for the input question. The computer program product includes a non-transitory computer readable storage medium having program instructions embodied therewith. The program instructions are executable by a computer to cause the computer to perform a method. The method includes calculating, by a processing element of the computer, a question representation for the input question, based on word annotations and word-level attentions calculated for the input question. The method further includes calculating, by the processing element, a sentence representation for each of the purportedly supporting statements, based on word annotations and word-level attentions calculated for each of the purportedly supporting statements. The method also includes calculating, by the processing element, a context representation for the set of purportedly supporting statements with respect to the sentence representation for each of the purportedly supporting statements. The method additionally includes generating, by the processing element, an answer to the input question based on the question representation and the context representation.

According to yet another aspect of the present invention, a method is provided for implementing a context-aware attention-based neural network for answering an input question given a set of purportedly supporting statements for the input question. The method includes calculating, by a processing element, a question representation for the input question, based on word annotations and word-level attentions calculated for the input question. The method further includes calculating, by the processing element, a sentence representation for each of the purportedly supporting statements, based on word annotations and word-level attentions calculated for each of the purportedly supporting statements. The method also includes calculating, by the processing element, a context representation for the set of purportedly supporting statements with respect to the sentence representation for each of the purportedly supporting statements. The method additionally includes generating, by the processing element, an answer to the input question based on the question representation and the context representation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention relates to a context-aware attention-based neural network for interactive question answering.

The context-aware attention-based neural network can be configured to learn a fine-grained representation for input sentences and develop a mechanism to interact with a user for comprehensively understanding the question. In an embodiment, a two-level attention-based neural architecture is provided that is employed at the word-level and sentence-level to compute a representation for all input sentences. In an embodiment, the context information extracted from the input story is allowed to influence the attention over each word. For example, in an embodiment, the context information affects the word semantic meaning contributing to a sentence representation.

Additionally, in an embodiment, an interactive mechanism can be applied to generate a supplementary question for the user when the model does not have sufficient evidence to answer the posed question immediately based on the existing knowledge. The user's feedback is then exploited to evaluate all of the input sentences and estimate the answer.

Figure 1:
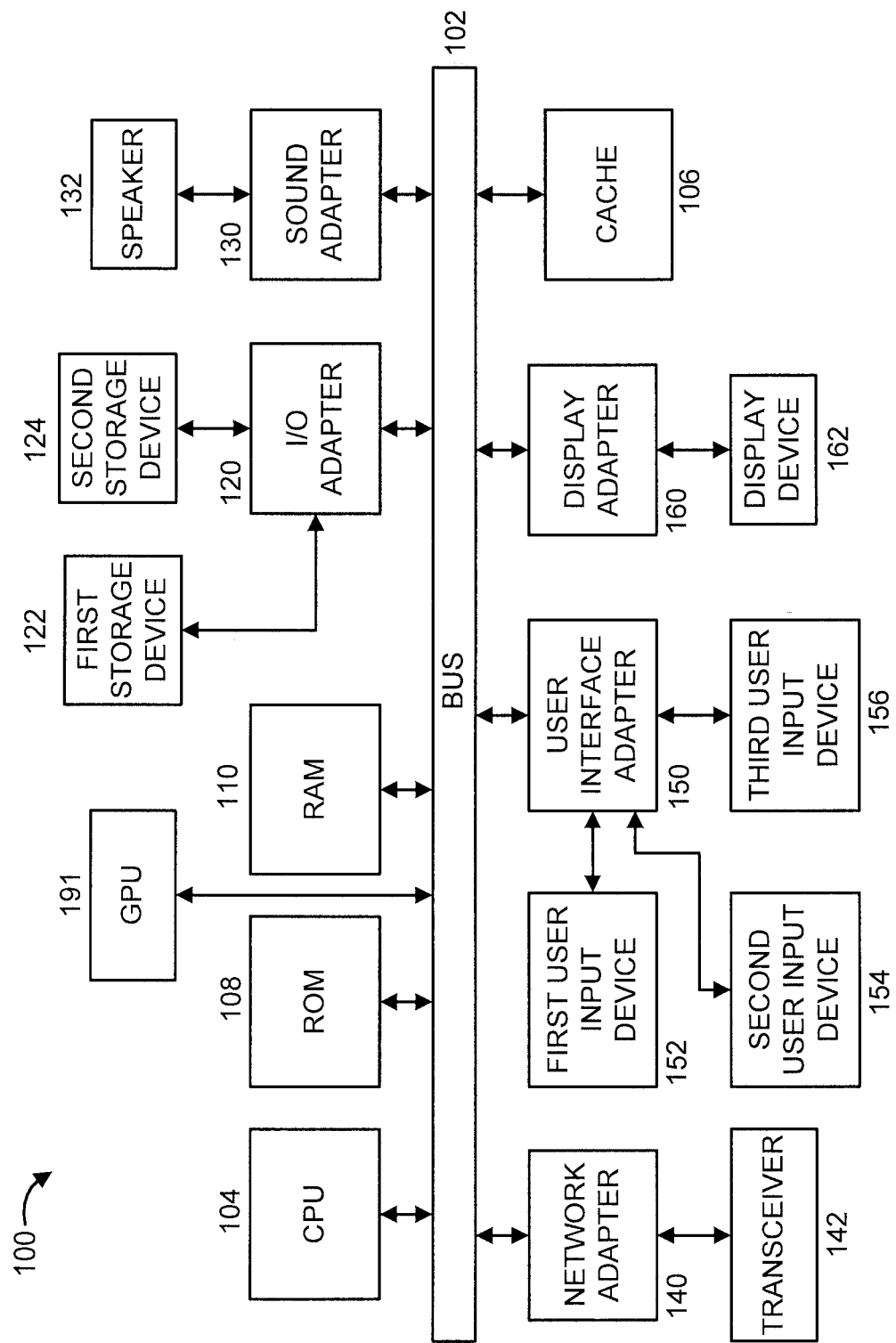
FIG. 1 is a block diagram illustrating an exemplary processing system to which the present principles can be applied, according to an embodiment of the present principles.

Referring now in detail to the figures in which like numerals represent the same or similar elements and initially to FIG. 1, a block diagram illustrating an exemplary processing system 100 to which the present principles can be applied, according to an embodiment of the present principles, is shown. The processing system 100 includes at least one Central Processing Unit (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 191 is operatively coupled to other components via the system bus 102. As used herein, the term "processing element" can refer to a hardware-based processor such as CPU 104, GPU 191, and so forth.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
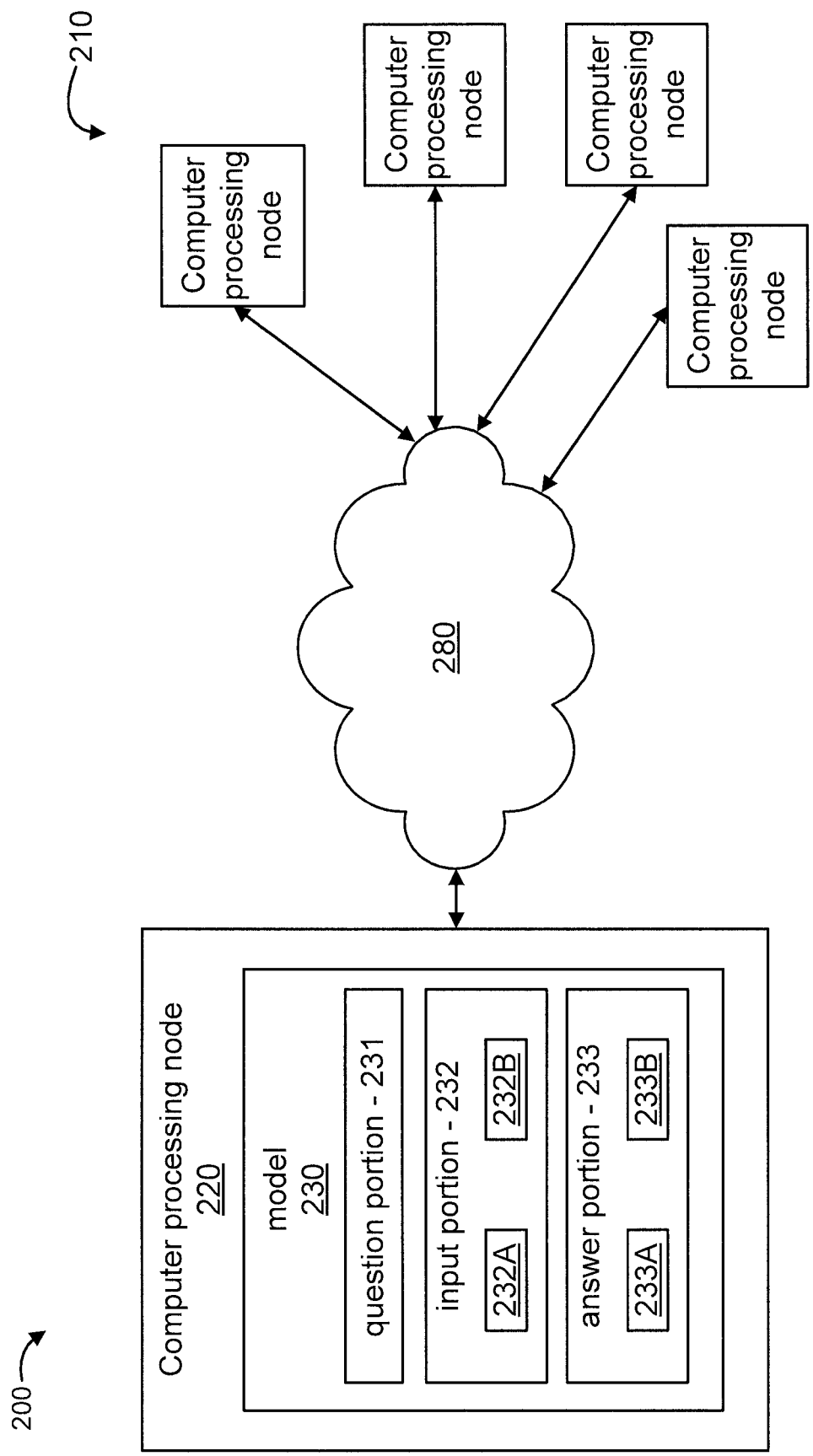
FIG. 2 shows an exemplary environment to which the present invention can be applied, in accordance with an embodiment of the present principles.

Moreover, it is to be appreciated that environment 200 described below with respect to FIG. 2 is an environment for implementing respective embodiments of the present principles. Part or all of processing system 100 may be implemented in one or more of the elements of environment 200.

Figure 3:
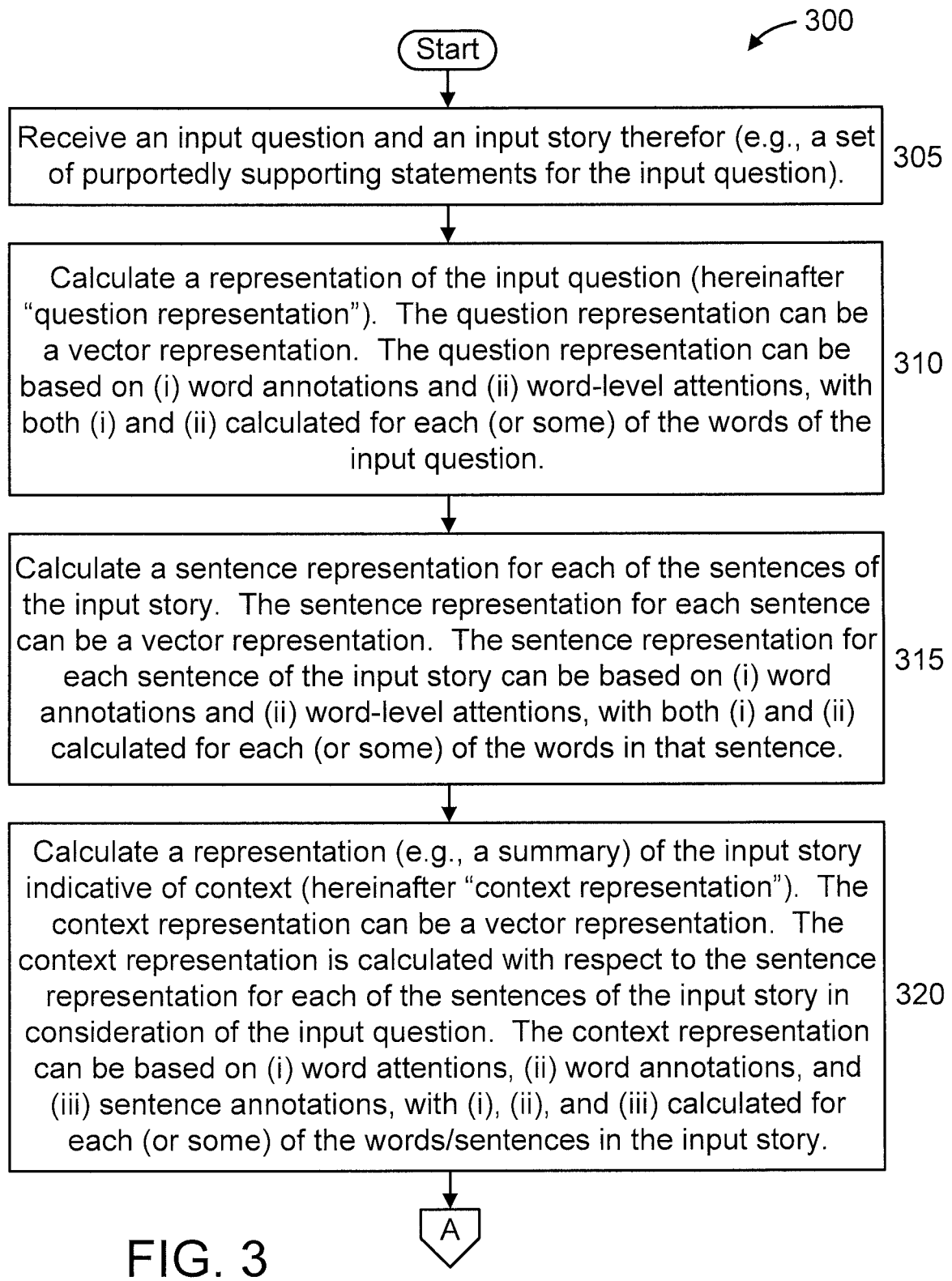
FIGS. 3-4 show an exemplary method for interactive question answering using a context-aware attention-based neural network, in accordance with an embodiment of the present invention.
Figure 4:
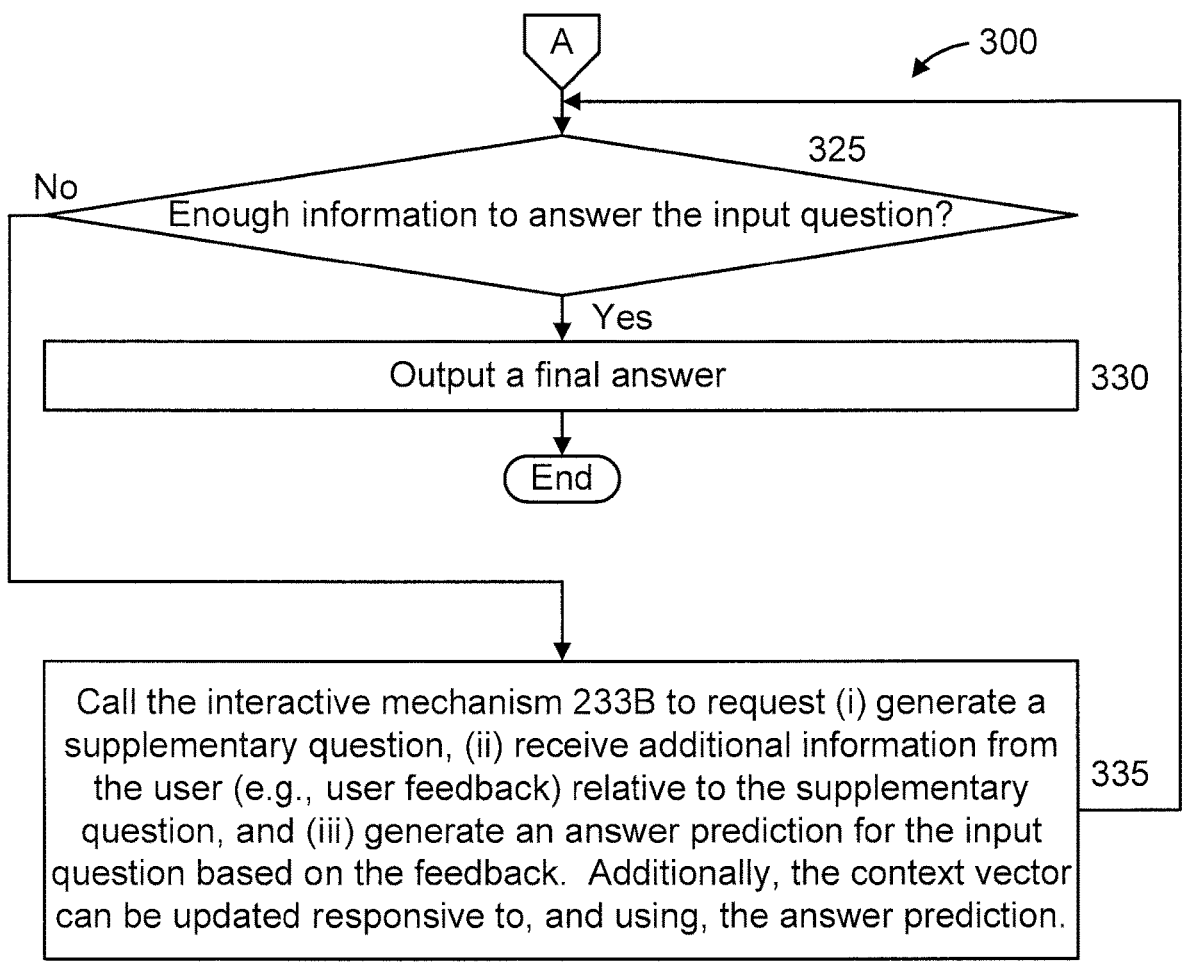

Further, it is to be appreciated that processing system 100 may perform at least part of the method described herein including, for example, at least part of method 300 of FIGS. 3-4. Similarly, part or all of environment 200 may be used to perform at least part of method 300 of FIGS. 3-4.

FIG. 2 shows an exemplary environment 200 to which the present invention can be applied, in accordance with an embodiment of the present principles. It is to be appreciated that environment 200 essentially implements a context-aware attention-based neural network for interactive question answering, in accordance with an embodiment of the present invention.

The environment 200 includes a set of computer processing nodes (collectively and individually denoted by the figure reference numeral 210), and a computer processing node 220. Each of the computing processing nodes in the set 210 is configured to be a source of questions by users that are supplied to the computer processing node 220 for answering.

Each of the computer processing nodes 210 in the set can be implemented by, for example, separate computing devices or different items (threads, processes, etc.) in a single computing device. Of course, other implementations can also be employed, while maintaining the spirit of the present invention.

The set of computer processing nodes 210 are interconnected by a communication medium 280. The communication medium 280 can involve any type of communication medium, depending upon the implementation. For example, a bus, a network, a Message Passing Interface (MPI), and so forth can be used, while maintaining the spirit of the present invention.

The computer processing node 220 includes and/or otherwise stores a model 230. The model 230 includes a question portion (interchangeably referred to herein as "question module") 231, an input portion (interchangeably referred to herein as "input module") 232, and an answer portion (interchangeably referred to herein as "answer module") 233. The model portions 231-233 can be implemented as, for example, software modules executed by a processor, hardware devices such as Application Specific Integrated Circuits (ASICs), and so forth.

The question portion 231 maps the question sentence into a sentence level space. The input portion 232 generates a context representation based on input sentences. The answer portion 233 makes a binary choice, either to generate an answer immediately or to take an interactive mechanism.

The input portion 232 of the model 230 includes a sentence encoder 232A and a context encoder 232B.

The answer portion 233 of the model 230 includes an answer generator 233A and an interactive mechanism 233B. The answer generator 233A can be considered to be, and is interchangeably referred to herein, as a decoder.

FIGS. 3-4 show an exemplary method 300 for interactive question answering using a context-aware attention-based neural network, in accordance with an embodiment of the present invention. Various representations are described herein with respect to method 300. For the sake of illustration and clarity, often one representation of an item is calculated and referred to. However, it is to be appreciated that more than one representation of an item can be calculated and used in accordance with the teachings of the present invention, while maintaining the spirit of the present invention.

At step 305, receive an input question and an input story therefor (e.g., a set of purportedly supporting statements for the input question). Step 305 can be performed by the question portion 231 of the model 230 of FIG. 2.

At step 310, calculate a representation of the input question (hereinafter "question representation"). The question representation can be a vector representation. The question representation can be based on (i) word annotations and (ii) word-level attentions, with both (i) and (ii) calculated for each (or some) of the words of the input question. Step 310 can be performed by the question portion 231 of the model 230 of FIG. 2.

At step 315, calculate a sentence representation for each of the sentences of the input story. The sentence representation for each sentence can be a vector representation. The sentence representation for each sentence of the input story can be based on (i) word annotations and (ii) word-level attentions, with both (i) and (ii) calculated for each (or some) of the words in that sentence. Step 315 can be performed by (the sentence encoder 232A of) the input portion 232 of the model 230 of FIG. 2.

At step 320, calculate a representation (e.g., a summary) of the input story indicative of context (hereinafter "context representation"). The context representation can be a vector representation. The context representation is calculated with respect to the sentence representation for each of the sentences of the input story in consideration of the input question. The context representation can be based on (i) word attentions, (ii) word annotations, and (iii) sentence annotations, with (i), (ii), and (iii) calculated for each (or some) of the words/sentences in the input story. Step 320 can be performed by (the context encoder 232B of) the input portion 232 of the model 230 of FIG. 2.

At step 325, determine whether the system (e.g., the answer portion 233 of model 230) has enough information to answer the question. If so, then proceed to step 330. Otherwise, proceed to step 335. Step 325 can be performed by the answer portion 233 of the model 230. Step 325 can be based on, for example, the question representation (calculated per step 305) and the context representation (calculated per step 320).

At step 330, output a final answer.

At step 335, call the interactive mechanism 233B to request (i) generate a supplementary question, (ii) receive additional information from the user (e.g., user feedback) relative to the supplementary question, and (iii) generate an answer prediction for the input question based on the feedback. In an embodiment, the context vector can be updated responsive to, and using, the answer prediction.

A further description will now be given regarding various aspects of the present invention.

To the preceding end, various preliminaries will now be described, in accordance with an embodiment of the present invention.

A Gated Recurrent Unit (GRU) is a variant of Recurrent Neural Networks (RNN), which has been widely adopted for a bunch of Natural Language Processing (NLP) tasks, such as machine translation and language modeling. GRU improves Long Short-term Memory (LSTM) by removing the cell component and making each hidden state adaptively capture the dependencies over different time scales using reset and update gates. For each time step t with input $x^t$ and previous hidden state $h^{t-1}$, we compute the updated hidden state $h^t = \text{GRU}(x^t, h^{t-1})$ as follows:

$$r^t = \sigma(U_r x^t + W_r h^{t-1} + b_r) \quad (1)$$

$$z^t = \sigma(U_z x^t + W_z h^{t-1} + b_z) \quad (2)$$

$$\tilde{h}^t = \tanh(U_h x^t + W_h (r^t \odot h^{t-1}) + b_h) \quad (3)$$

$$h^t = z^t \odot h^{t-1} + (1 - z^t) \odot \tilde{h}^t \quad (4)$$

where $\sigma$ is the sigmoid activation function, $\odot$ is an element-wise product, $U_r, U_z, U_h \in \mathbb{R}^{K \times N}$, $W_r, W_z, W_h \in \mathbb{R}^{K \times K}$, $b_r, b_z, b_h \in \mathbb{R}^{K \times 1}$, K is the hidden size and N is the input size.

A further description will now be provided of the method of the present invention, in accordance with an embodiment of the present invention.

Herein, the proposed model is further described, including the question module, the input module, and the answer module. Also, the training procedure of the proposed model is further described.

A description of a model framework to which the present invention can be applied will now be described, in accordance with an embodiment of the present invention.

Given a story represented by a sequence of N sentences, i.e., $(l_1, \ldots, l_N)$, and a question q, our task is to generate an answer a to this target question, which can be a single word or a sentence. Each sentence $l_t$ includes a sequence of $N_t$ words, denoted as $(w_1^t, \ldots, w_{N_t}^t)$, and a question with $N_q$ words is represented as $(w_1^q, \ldots, w_{N_q}^q)$. Let V denote the size of dictionary, including the words from each of $l_t$, q and a, and end-of-sentence (EOS) symbols.

Figure 5:
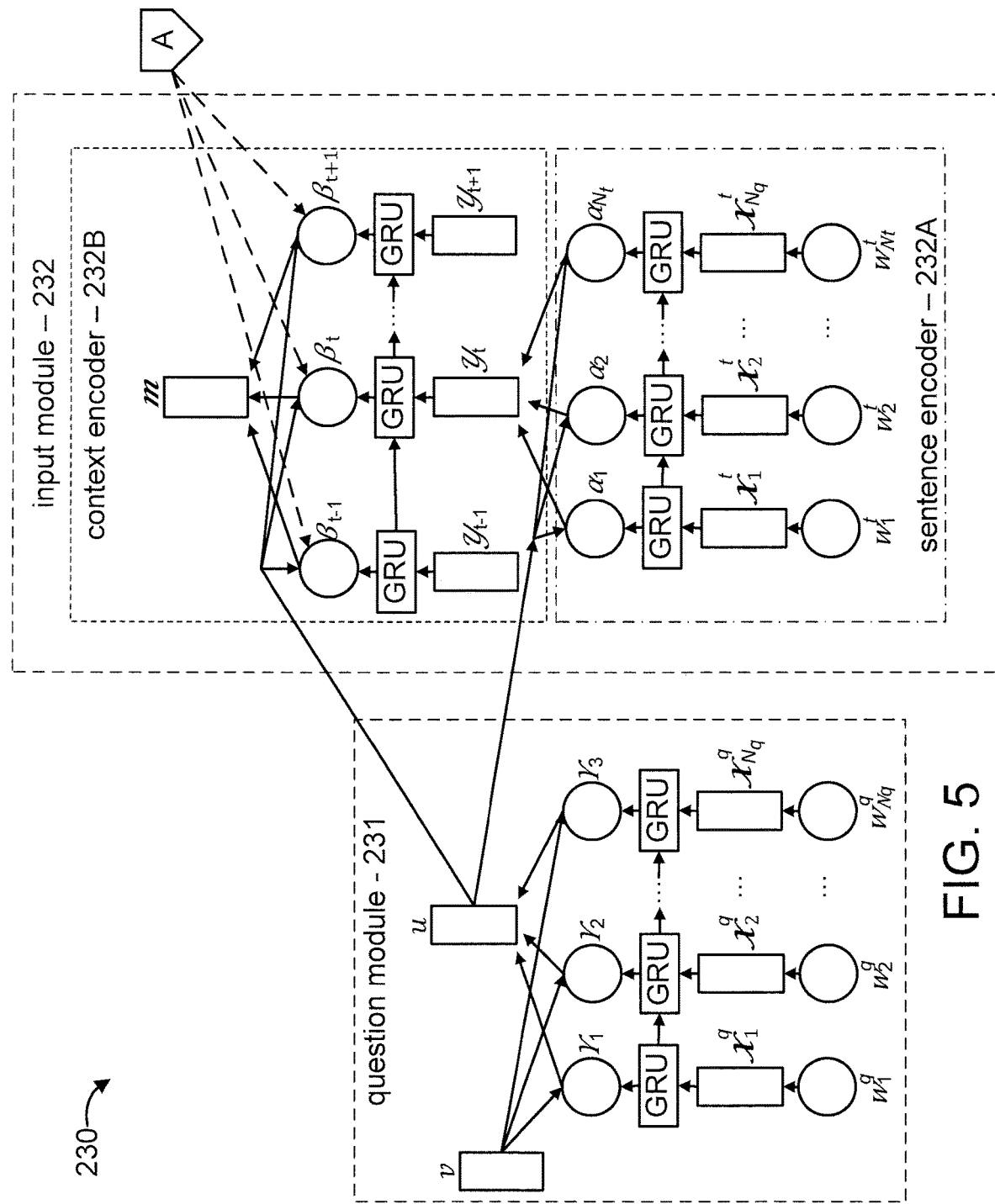
FIGS. 5-6 further show the model for implementing interactive question answering of FIG. 2, in accordance with an embodiment of the present invention.
Figure 6:
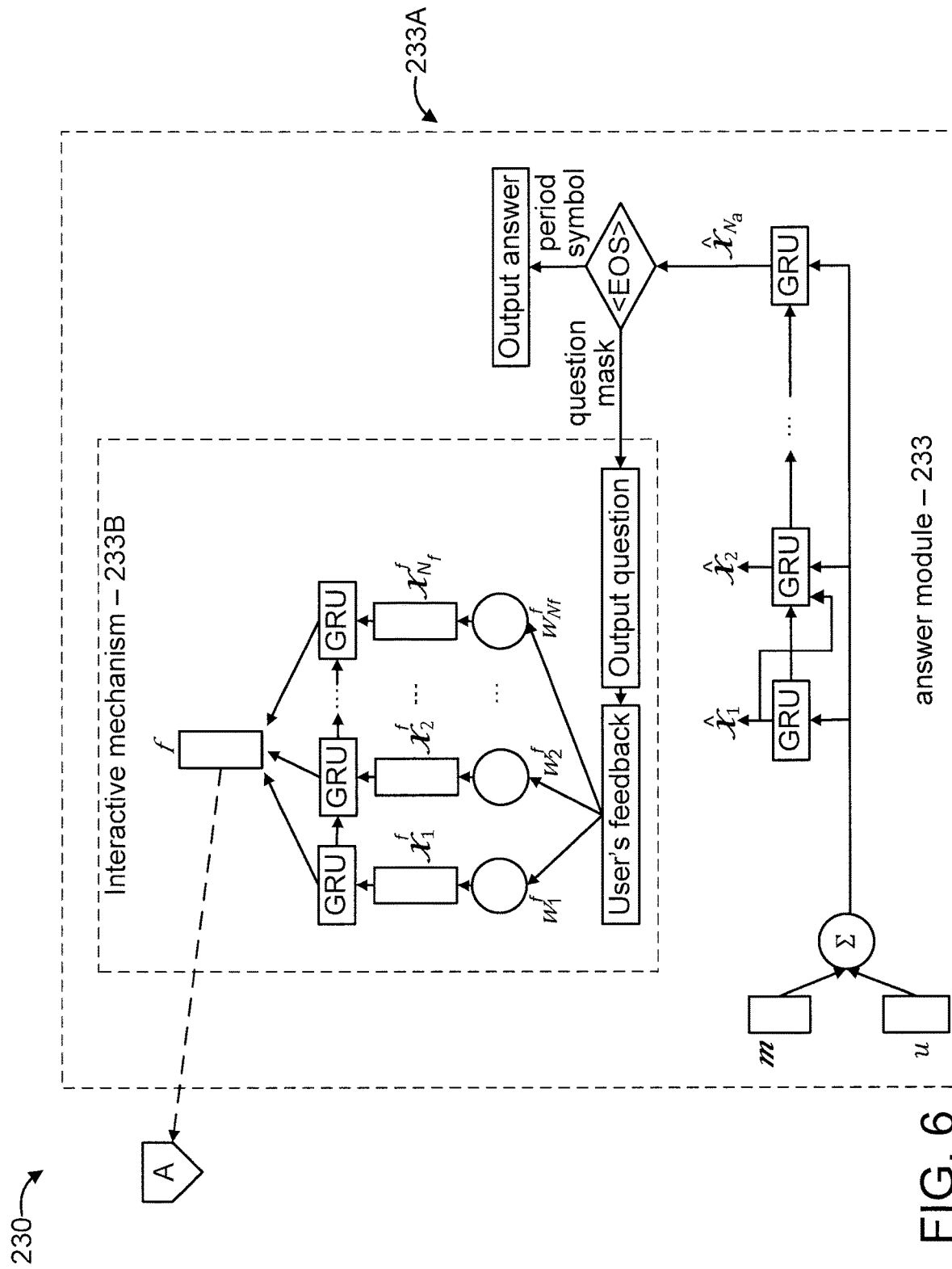

The framework of our model is shown in FIGS. 5-6. That is, FIGS. 5-6 further show the model 230 for implementing interactive question answering of FIG. 2, in accordance with an embodiment of the present invention.

As noted above, the model 230 includes the following three key portions (interchangeably referred to herein as modules, as noted above): question module 231, input module 232, and answer module 233.

The question module 231 encodes the target question into a vector representation.

The input module 232 encodes a set of input sentences into a vector representation.

The answer module 233 generates an answer based on the outputs of the question module 231 and the input module 232. Different from traditional QA models, it has two choices, either outputting an answer immediately or interacting with users. If the model lacks sufficient evidence for answer prediction based on the comprehension ability of a question at a current timestamp, then an interactive mechanism is enabled. Specifically, the model generates a supplementary question, and the user needs to provide feedback, which is exploited to estimate an answer.

A further description will now be given of the question module 231, in accordance with an embodiment of the present invention.

Suppose a question is a sequence of $N_q$ words, we encode each word $w_j$ into a $K_w$-dimensional vector space $x_j^q$ through an embedding matrix $W_w \in \mathbb{R}^{K_w \times V}$, i.e., $x_j^q = W_w[w_j]$, where $[w_j]$ is a one-hot vector associated with word $w_j$. The sequence order within a sentence significantly affects each individual word's semantic meaning due to its dependence on previous words. To capture this contextual information in the question, a GRU is employed to obtain an annotation for each word. GRU takes each word vector $x_j^q$ as input and updates the corresponding hidden state $g_j^q \in \mathbb{R}^{K_h \times 1}$:

$$g_j^q = GRU_w(g_{j-1}^q, x_j^q) \quad (5)$$

where the subscript of GRU is used to distinguish other GRUs described hereinafter. The hidden state $g_j^q$ can be regarded as the annotation vector of word $w_j$ by incorporating the context meaning of a question. We also explore a variety of encoding schema, such as LSTM and RNN. However, LSTM pronely leads to overfitting by the reason of expensive parameters, and RNN has a poor performance for the sake of exploding and vanishing gradient problem.

In addition, each word contributes differently to the representation of a question. For example, in the question "Where is the football?", "where" and "football" play a critical role in summarizing this sentence. Therefore, an attention mechanism is introduced to generate a representation of a question by focusing on those important words for its semantic meaning. A positive weight $\gamma_j$ is placed on each word to indicate the relative importance of contribution to the representation of the question. To be specific, this importance weight is measured as the similarity of corresponding word annotation vector $g_j$ and a word level latent vector $v \in \mathbb{R}^{K_h \times 1}$ for a question which is jointly learned during the training process. The question representation $u \in \mathbb{R}^{K_c \times 1}$ is then generated by a weighted summation of the word annotation vectors and corresponding important weights, where we also use a one-layer MLP to transfer it from sentence-level space into the context-level space, as follows:

$$\gamma_j = \text{softmax}(v^T g_j^q) \quad (6)$$

$$u = W_{ch} \Sigma_{j=1}^{N_q} \gamma_j g_j^q + b_c^{(q)} \quad (7)$$

where a softmax function is taken to normalize the weights, i.e., $$\text{softmax}(x_i) = \frac{\exp(x_i)}{\sum_{j'} \exp(x_{j'})}, W_{ch} \in \mathbb{R}^{K_c \times K_h}, \text{ and } b_c^{(q)} \in \mathbb{R}^{K_c \times 1}.$$

A further description will now be given regarding the input module 232, in accordance with an embodiment of the present invention.

The input module 232 aims at generating a representation for input sentences, including a sentence encoder 232A and a context encoder 232B. The sentence encoder 232A computes a sentence representation, and context encoder 232B calculates a presentation of input sentences, both of which are introduced in the following sections.

A description will now be given of the sentence encoder 232A that is part of the input module 232, in accordance with an embodiment of the present invention.

For each input sentence $l_t$, including a sequence of $N_t$ words $(w_1, \ldots, w_{N_t})$, similar to the question module, each word $w_i$ is embedded into word space $x_i^t \in \mathbb{R}^{K_w \times 1}$ with embedding matrix $W_w$, and a recurrent neural network is exploited to capture the context information from the words which have already been generated in the same sentence. Let $h_i^t \in \mathbb{R}^{K_h \times 1}$ denote the hidden state which can be interpreted as the word annotation in the input space. A GRU retrieves each word annotation by taking word vector as input and relying on previous hidden state, $$h_i^t = GRU_w(h_{i-1}^t, x_i^t) \quad (8)$$

In Equation (8), each word annotation vector takes the sequence order into consideration to learn its semantic meaning based on previous information within a sentence through a recurrent neural network. A question answering system is usually given multiple input sentences which often form a story together. A single word has different meaning in the different stories. Learning a single sentence context at which a word is located is insufficient to understand the meaning of this word, in particular when the sentence is placed in a story context. In other words, only modeling a sequence of words prior to a word within a sentence may lose some important information which results in the failure of the generation of sentence representation. Hence, we take the whole context into account as well to appropriately characterize each word and well understand this sentence's meaning. Suppose $s_{t-1} \in \mathbb{R}^{K_c \times 1}$ is the annotation vector of previous sentence $l_{t-1}$, which will be introduced hereinafter. To incorporate context information generated by previous sentences, we feed word annotation $h_i^t$ and previous sentence annotation $s_{t-1}$ through a two-layer MLP, where a context-aware word vector $e_i^t \in \mathbb{R}^{K_c \times 1}$ is obtained as follows:

$$e_i^t = \sigma(W_{ee} \tan h(W_{es} s_{t-1} + W_{eh} h_i^t + b_e^{(1)}) + b_e^{(2)}) \quad (9)$$

where $W_{ee}, W_{es} \in \mathbb{R}^{K_c \times K_c}$ and $W_{eh} \in \mathbb{R}^{K_c \times K_h}$ are weight matrices, and $b_e^{(1)}, b_e^{(2)} \in \mathbb{R}^{K_c \times 1}$ are the bias terms. It is worth noting that $s_{t-1}$ is dependent on its previous sentence. Recursively, this sentence relies on its previous one as well. Hence, this way is able to model the previous context. In addition, the sentence representation will focus on those words which are able to address the question. Inspired by this intuition, another word level attention mechanism is introduced to attend informative words about the question for generating a sentence's representation. As the question representation is utilized to guide the word attention, a positive weight $\alpha_i^t$ associated with each word is computed as the similarity of the question vector u and the corresponding context-aware word vector $e_i^t$. Then the sentence representation $y_t \in \mathbb{R}^{K_s \times 1}$ is generated by aggregating the word annotation vectors with different weights, $$\alpha_i^t = \text{softmax}(u^T e_i^t), y_t = \Sigma_{i=1}^{N_t} \alpha_i^t h_i^t \quad (10)$$

A description will now be given of the context encoder 232B that is part of the input module 232, in accordance with an embodiment of the present invention.

Suppose a story includes a sequence of sentences, i.e., ($l_1$, ..., $l_N$), each of which is encoded as a $K_s$-dimensional vector $y_t$ through a sentence encoder 232A. As input sentences have sequence order, simply exploiting their sentence vectors for context generation weakens the inner logic exhibited in the whole context. To address this issue, a sentence annotation vector is also introduced to capture both previous context and this sentence's own meaning through a GRU. Given the sentence vector $y_i^t$ and the state $s_{t-1}$ of previous sentence, its annotation vector $s_t \in \mathbb{R}^{K_c \times 1}$ is obtained as follows:

$$s_t = GRU_s(s_{t-1}, y_i^t) \quad (11)$$

A GRU can learn a sentence's meaning based on previous context information. However, just relying on GRU at sentence level using simple word embedding vectors makes it difficult to learn the precise semantic meaning for each word in the story. It is the reason why we introduce a context-aware attention-based mechanism shown in Equation (9) to well encode each word for the generation of sentence representation, which guarantees that each word is reasoned under the specific context.

Once the sentence annotation vectors ($s_1^t$, ..., $s_N^t$) are obtained as described above, a sentence level attention mechanism is enabled to emphasize those sentences that are highly relevant to the question. We can estimate the attention weight $\beta_t$ with the similarity of the question and the corresponding sentence. Hence, the context representation m is retrieved by summing over all sentence representations associated with corresponding attention weights, and given by the following:

$$\beta_t = \text{softmax}(u^T s_t) \quad (12)$$

$$m = \Sigma_{t=1}^{N} \beta_t s_t \quad (13)$$

Similar to a bidirectional RNN, our approach also can be extended to use another sentence-level GRU that moves backward through time beginning from the end of the sequence.

A description will now be given of the answer module 233, in accordance with an embodiment of the present invention.

The answer module 233 utilizes a decoder to generate an answer, where it has two output cases according to the understanding ability of both the question and the context. One output case involves generating the answer immediately after receiving the context and question information. The other output case involves generating a supplementary question and then use user's feedback to predict answer. This process is taken by an interactive mechanism 233B.

A description will now be given regarding answer generation, in accordance with an embodiment of the present invention.

Given the question representation u and the context representation m, another GRU is used as the decoder to generate a sentence as the answer. To fuse u and m, we take summation procedure rather than concatenation of two vectors for the sake of decreasing the parameter number when fed into recurrent neural networks. Suppose $\hat{x}_{k-1} \in \mathbb{R}^{K_w \times 1}$ is the predicted word vector in last step, GRU updates the hidden state $z_k \in \mathbb{R}^{K_c \times 1}$ as follows:

$$\hat{x}_k \stackrel{W_w}{=} \text{softmax}(W_{od} z_k + b_o), z_k = GRU_d(z_{k-1}, [m+u, \hat{x}_{k-1}]) \quad (14)$$

where $\stackrel{W_w}{=}$ denotes the predicted word vector through embedding matrix $W_w$. Note that we require that each sentence ends with a special EOS symbol, including a question mask and period symbol, which enables the model to define a distribution over sentences of all possible lengths.

A description will now be given regarding output choices relating to answer generation, in accordance with an embodiment of the present invention.

In practice, the system is not always able to answer a question immediately based on its current knowledge due to the lack of some information bridging the gap between question and context knowledge or the uncertainty of the question. To address this issue, we allow the decoder to make a binary choice, either to generate an answer immediately, or to enable an interactive mechanism 233B. Specifically, if the system has sufficiently strong evidence for the answer prediction to be successful, the decoder will directly output the answer. Otherwise, the system generates a supplementary question for user, where an example is shown in TABLE 2. In the example of TABLE 2, "SQ" denotes a supplementary question. At this time, this user needs to offer feedback for a supplementary question. The provided feedback is then exploited to generate an answer to the target question. This procedure can be considered to be the interactive mechanism 233B.

TABLE 2

| | |
|---|---|
| Problem | The master bedroom is east of the garden. |
| | The guest bedroom is east of the office. |
| | Target Question: What is the bedroom east of? |
| Interactive Mechanism | System: Which bedroom, master one or guest one? (SQ) |
| | User: Master bedroom (User's Feedback) |
| | System: Garden. (Predicted Answer) |

The sentence generated by the decoder ends with a special symbol, either a question mark or a period symbol. Hence, this special symbol is utilized to make a decision. In other words, if the EOS symbol is a question mark, then the generated sentence is regarded as a supplementary question and an interactive mechanism 233B is enabled. Otherwise, the generated sentence is the estimated answer and the prediction task is done.

A further description will now be given of the interactive mechanism 233B, in accordance with an embodiment of the present invention.

The interactive process is summarized as follows: (1) the decoder generates a supplementary question; (2) the user provides a feedback; 3) the feedback is used for answer prediction for the target question. Suppose the feedback includes a sequence of words, denoted as ($w_1^f$, ..., $w_{N_f}^f$). Similar to the input module, each word $w_d^f$ is embedded to a vector $x_d^f$ through an embedding matrix $W_w$. Then, the corresponding annotation vector $g_d^f \in \mathbb{R}^{K_f \times 1}$ is retrieved via a GRU by taking the embedding vector as input, and shown as follows:

$$g_d^f = GRU_w(g_{d-1}^f, x_d^f) \quad (15)$$

Based on the annotation vectors, a representation $f \in \mathbb{R}^{K_f \times 1}$ could be obtained by a simple attention mechanism where each word is considered to contribute equally, and given by the following:

$$f = \frac{1}{N_f} \sum_{d=1}^{N_f} g_d^f \quad (16)$$

Our goal is utilizing feedback representation f to generate an answer to the target question. The provided feedback enhances comprehension ability of a question by distinguishing the importance of each input sentence of the question. In other words, the more similar an input sentence is to the content mentioned in feedback, the larger probability it has to address the question. Hence, we can refine the attention weight of each sentence shown in Equation (13) after receiving user's feedback, given by the following:

$$r=\tan h(W_{rf}f+b_r) \tag{17}$$

$$\beta_t=\text{softmax}(u^t \cdot s_t + u^t \cdot r) \tag{18}$$

where $W_{rf} \in \mathbb{R}^{K_c K_f}$ and $b_r \in \mathbb{R}^{K_c \times 1}$ are the weight matrix and bias vector, respectively. Equation (17) is a one-layer neural network to transfer feedback representation to context space. After obtaining the newly learned attention weights, we update the context representation using the soft-attention operation shown in Equation (13). This updated context representation and question representation will be used as the input for decoder to generate an answer. Note that for simplifying the problem, we allow the decoder to only generate at most one supplementary question. In addition, one advantage of exploiting a user's feedback to update the attention weights of input sentences is that we do not need to re-train the encoder again once a feedback is entering the system.

A description will now be given of a training procedure to which the present invention can be applied, in accordance with an embodiment of the present invention.

During training, all modules share an embedding matrix. There are three different GRUs employed for sentence encoding, context encoding and answer/supplementary question decoding. In other words, the same GRU is used to encode question, input sentences and the user's feedback. The second GRU is applied to generate context representation and the third one is used as decoder. Of course, other allocations can also be used, while maintaining the spirit of the present invention. Training can be treated as a supervised classification problem to minimize the cross-entropy error of the answer sequence and the supplementary question sequence.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A context-aware attention-based neural network for answering an input question given a set of purportedly supporting statements for the input question, the neural network comprising:
   a processing element configured to
      calculate a question representation for the input question, based on word annotations and word-level attentions calculated for the input question;
      calculate a context-aware word vector for each word in each of the purportedly supporting statements, based on word annotations, word-level attentions, and calculated annotation vectors of previous sentences among the purportedly supporting statements;
      calculate a sentence representation for each of the purportedly supporting statements, based on the context-aware word vectors and weights representing similarities between the context-aware word vectors and the question representation;
      calculate a context representation for the set of purportedly supporting statements with respect to the sentence representation for each of the purportedly supporting statements; and
      generate an answer to the input question based on the question representation and the context representation.

2. The context-aware attention-based neural network of claim 1, wherein the processing element is further configured to:
   determine whether sufficient information exists to generate the answer based on the question representation and the context representation; and
   invoke, responsive to a determination that sufficient information is lacking to generate the answer based on the question representation and the context representation, an interactive process that (i) poses a supplemental question to a user, (ii) obtains feedback for the supplement question from the user, and (iii) generates an answer prediction for the input question based on the feedback.

3. The context-aware attention-based neural network of claim 2, wherein the processing element is configured to generate the answer to the input question based on the question representation and the context representation and bypass the interactive process, responsive to a determination that sufficient information exists to generate the answer based on the question representation and the context representation.

4. The context-aware attention based neural network of claim 2, wherein the processing element is configured to dynamically update the context representation responsive to, and using, the answer prediction.

5. The context-aware attention-based neural network of claim 1, wherein the processing element is further configured to employ a binary decision process that selectively (i) outputs the answer to the input question based on the question representation and the context representation and bypasses an interactive process, and (ii) invokes the interactive process that uses a supplementary question and user feedback to generate an answer prediction for the input question.

6. The context-aware attention-based neural network of claim 1, wherein the processing element is further configured to influence an attention over each word in the set of purportedly supporting statements using context information extracted from the set of purportedly supporting statements.

7. The context-aware attention-based neural network of claim 1, wherein the processing element is further configured to affect a word semantic meaning contributing to the sentence representation of one or more of the purportedly supporting statements using context information extracted from the set of purportedly supporting statements.

8. The context-aware attention-based neural network of claim 1, wherein the context-aware attention-based neural network is embodied in an Application Specific Integrated Circuit.

9. The context-aware attention-based neural network of claim 1, wherein the word-level attentions calculated for the input question are embodied as importance weights placed on each of the words in the input sentence to indicate a relative importance of contribution to the question representation.

10. The context-aware attention-based neural network of claim 9, wherein each of the importance weights are measured as respective vector similarities of word-based vectors derived from words in the input question.

11. The context-aware attention-based neural network of claim 1, wherein the processing element uses one or more Gated Recurrent Units to calculate the question representation, the sentence representation, and the context representation.

12. A computer program product for implementing a context-aware attention-based neural network for answering an input question given a set of purportedly supporting statements for the input question, the computer program product comprising a non-transitory computer readable storage medium having program instructions embodied therewith, the program instructions executable by a computer to cause the computer to perform a method comprising:

calculating, by a processing element of the computer, a question representation for the input question, based on word annotations and word-level attentions calculated for the input question;

calculating, by the processing element, a context-aware word vector for each word in each of the purportedly supporting statements, based on word annotations, word-level attentions, and calculated annotation vectors of previous sentences among the purportedly supporting statements;

calculating, by the processing element, a sentence representation for each of the purportedly supporting statements, based on the context-aware word vectors and weights representing similarities between the context-aware word vectors and the question representation;

calculating, by the processing element, a context representation for the set of purportedly supporting statements with respect to the sentence representation for each of the purportedly supporting statements; and generating, by the processing element, an answer to the input question based on the question representation and the context representation.

13. The computer program product of claim 12, wherein the method further comprises:

determining whether sufficient information exists to generate the answer based on the question representation and the context representation; and invoking, responsive to a determination that sufficient information is lacking to generate the answer based on the question representation and the context representation, an interactive process that (i) poses a supplemental question to a user, (ii) obtains feedback for the supplement question from the user, and (iii) generates an answer prediction for the input question based on the feedback.

14. The computer program product of claim 13, wherein the processing element is configured to generate the answer to the input question based on the question representation and the context representation and bypass the interactive process, responsive to a determination that sufficient information exists to generate the answer based on the question representation and the context representation.

15. The computer program product of claim 13, wherein the context representation is dynamically updated responsive to, and using, the answer prediction.

16. The computer program product of claim 12, wherein the method further comprises employing a binary decision process that selectively (i) outputs the answer to the input question based on the question representation and the context representation and bypasses an interactive process, and (ii) invokes the interactive process that uses a supplementary question and user feedback to generate an answer prediction for the input question.

17. The computer program product of claim 12, wherein the method further comprises influencing an attention over each word in the set of purportedly supporting statements using context information extracted from the set of purportedly supporting statements.

18. The computer program product of claim 12, wherein the method further comprises affecting a word semantic meaning contributing to the sentence representation of one or more of the purportedly supporting statements using context information extracted from the set of purportedly supporting statements.

19. A method for implementing a context-aware attention-based neural network for answering an input question given a set of purportedly supporting statements for the input question, the method comprising:

calculating, by a processing element, a question representation for the input question, based on word annotations and word-level attentions calculated for the input question;

calculating, by the processing element, a context-aware word vector for each word in each of the purportedly supporting statements, based on word annotations, word-level attentions, and calculated annotation vectors of previous sentences among the purportedly supporting statements;

calculating, by the processing element, a sentence representation for each of the purportedly supporting statements, based on the context-aware word vectors and weights representing similarities between the context-aware word vectors and the question representation;

calculating, by the processing element, a context representation for the set of purportedly supporting statements with respect to the sentence representation for each of the purportedly supporting statements; and generating, by the processing element, an answer to the input question based on the question representation and the context representation.

\* \* \* \* \*